(12) United States Patent
Wang et al.

(10) Patent No.: US 11,436,137 B2
(45) Date of Patent: Sep. 6, 2022

(54) MEMORY DEVICE AND OPERATION METHOD FOR PERFORMING WEAR LEVELING ON A MEMORY DEVICE

(71) Applicants: Jiangsu Advanced Memory Technology Co., Ltd., Jiangsu (CN); Jiangsu Advanced Memory Semiconductor Co., Ltd., Jiangsu (CN)

(72) Inventors: Chien Chuan Wang, Hsinchu County (TW); Chengyu Xu, Hsinchu County (TW)

(73) Assignees: JIANGSU ADVANCED MEMORY TECHNOLOGY CO., LTD., Jiangsu (CN); JIANGSU ADVANCED MEMORY SEMICONDUCTOR CO., LTD., Jiangsu (CN)

( * ) Notice: Subject to any disclaimer, the term of this patent is extended or adjusted under 35 U.S.C. 154(b) by 0 days.

(21) Appl. No.: 16/927,974

(22) Filed: Jul. 13, 2020

(65) Prior Publication Data
US 2021/0357317 A1    Nov. 18, 2021

(30) Foreign Application Priority Data

May 18, 2020 (CN) .......................... 202010417279.9

(51) Int. Cl.
*G06F 12/02* (2006.01)
*G06F 16/901* (2019.01)

(52) U.S. Cl.
CPC ...... *G06F 12/0246* (2013.01); *G06F 16/9017* (2019.01); *G06F 2212/7211* (2013.01)

(58) Field of Classification Search
CPC ............. G06F 12/0246; G06F 16/9017; G06F 2212/7211
See application file for complete search history.

(56) References Cited

U.S. PATENT DOCUMENTS

| | | | |
|---|---|---|---|
| 2008/0140918 A1* | 6/2008 | Sutardja | G06F 12/0246 711/E12.001 |
| 2009/0122949 A1* | 5/2009 | Reid | G11C 16/349 377/15 |
| 2010/0017555 A1* | 1/2010 | Chang | G06F 12/0246 711/103 |
| 2012/0284587 A1* | 11/2012 | Yu | G06F 3/0631 714/773 |
| 2014/0379960 A1* | 12/2014 | Linkewitsch | G06F 3/065 711/103 |
| 2018/0113636 A1* | 4/2018 | Kwon | G06F 3/0688 |
| 2018/0329815 A1* | 11/2018 | Song | G06F 12/0246 |

* cited by examiner

*Primary Examiner* — Tasnima Matin
(74) *Attorney, Agent, or Firm* — CKC & Partners Co., LLC (57) ABSTRACT

An operation method is applied to a memory device. The memory device includes a plurality of memory tiles. The operation method includes following steps: utilizing a first wear leveling process to perform an intra-tile wear leveling on the plurality of memory tiles by a processor; and utilizing a second wear leveling process to perform an inter-tile wear leveling on the plurality of memory tiles by the processor.

17 Claims, 6 Drawing Sheets

MEMORY DEVICE AND OPERATION METHOD FOR PERFORMING WEAR LEVELING ON A MEMORY DEVICE

RELATED APPLICATIONS

This application claims priority to Chinese Application Serial Number 202010417279.9 filed May 18, 2020, which is herein incorporated by reference.

BACKGROUND

Technical Field

The present disclosure relates to a memory technology. More particularly, the present disclosure relates to a memory device and an operation method.

Description of Related Art

With developments of the memory technology, memory devices have been applied to various electrical apparatuses. In general, a memory device includes multiple tiles. When a variation of access numbers of the tiles is larger, there are negative impacts to the memory device.

SUMMARY

One embodiment of the present disclosure is related to an operation method. The operation method is applied to a memory device. The memory device includes a plurality of memory tiles. The operation method includes following steps: utilizing a first wear leveling process to perform an intra-tile wear leveling on the plurality of memory tiles by a processor; and utilizing a second wear leveling process to perform an inter-tile wear leveling on the plurality of memory tiles by the processor.

One embodiment of the present disclosure is related to an operation method. The operation method includes following steps: calculating a plurality of first read/write probability values of a plurality of initial addresses of a memory device by a processor; generating a transfer function according to the plurality of first read/write probability values by the processor; and generating a plurality of reassigned addresses based on the transfer function by the processor. The plurality of reassigned addresses have a plurality of second read/write probability values respectively, and a variation of the plurality of second read/write probability values is smaller than a variation of the plurality of first read/write probability values.

One embodiment of the present disclosure is related to a memory device. The memory device includes a processor, a plurality of memory tiles, at least one main bus, and at least one tile interconnect bus. The at least one main bus is disposed among the plurality of memory tiles. The at least one tile interconnect bus is disposed among the plurality of memory tiles. The processor performs an intra-tile wear leveling on the plurality of memory tiles through the at least one tile interconnect bus.

As the embodiments above, the memory device and the operation method can perform the wear leveling on the memory tiles effectively.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure. In addition, the drawings are for illustrative purposes only, and are not drawn in accordance with the original sizes. For ease of understanding, the same components or similar components in the following description will be described with the same reference numerals.

In the present disclosure, "connected" or "coupled" may refer to "electrically connected" or "electrically coupled." "Connected" or "coupled" may also refer to operations or actions between two or more elements.

Figure 1:
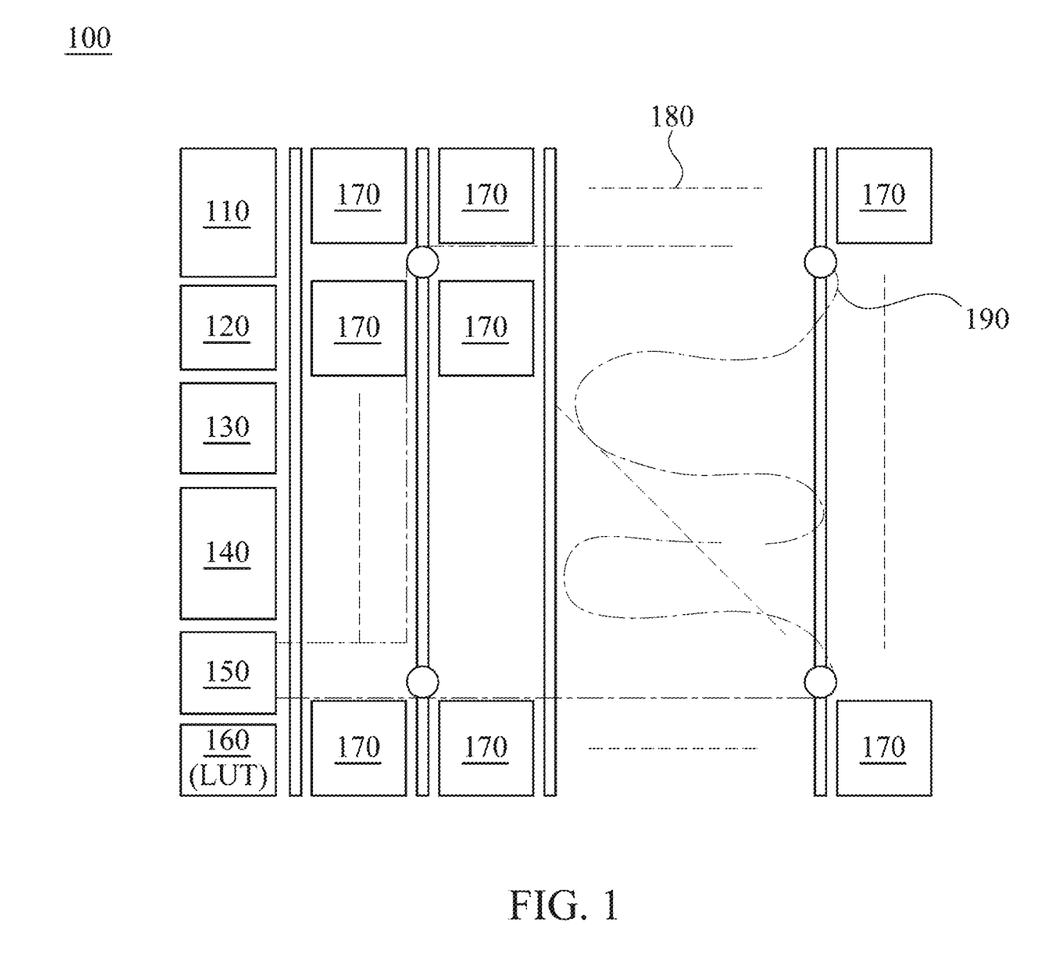
FIG. 1 is a schematic diagram illustrating a memory device according to some embodiments of the present disclosure.

Reference is made to FIG. 1. FIG. 1 is a schematic diagram illustrating a memory device 100 according to some embodiments of the present disclosure. As illustrated in FIG. 1, the memory device 100 includes an analog circuit 110, a finite-state machine (FSM) 120, a read/write buffer 130, an input/output port 140, a processor 150, a storage circuit 160, and memory tiles 170.

In some embodiments, the memory device 100 is a phase-change memory (PCM) device. In some other embodiments, the memory device 100 is a flash memory device, a magnetoresistive random access memory (MRAM) device, or a resistive random-access memory (RRAM) device.

In some embodiments, the processor 150 is implemented by a micro-processor. For example, the processor 150 may be an embedded processor, but the present disclosure is not limited thereto. The processor 150 may be implemented by various electrical elements having the processing/controlling function. In some embodiments, the storage circuit 160 is implemented by a static random access memory (SRAM), but the present disclosure is not limited thereto.

The memory tiles 170 are arranged in an array from. For example, if a storage capacity of the memory device 100 is 4 GB, the memory device 100 may include 64×64 memory tiles 170 and a storage capacity of each of the memory tiles 170 is 1 MB.

As illustrated in FIG. 1, the memory device 100 further includes main buses 180 and tile interconnect buses (TIB) 190. The main buses 180 and the tile interconnect buses 190 are disposed among the memory tiles 170. Each of the main buses 180 is a high speed memory bus. The processor 150 can send control signals to the memory tiles 170 to control the memory tiles 170 through the main buses 180 and the tile interconnect buses 190.

In some embodiments, the processor 150 performs the wear leveling on the memory tiles 170 under a fixed workload through the tile interconnect buses 190. For example, when the system performs a same operation (for example, displaying a video), the memory device 100 has a fixed workload. In this situation, the processor 150 can perform the intra-tile wear leveling on the memory tiles 170 through the tile interconnect buses 190 by utilizing a first wear leveling process (a static wear leveling process). In addition, the processor 150 can perform the inter-tile wear leveling on the memory tiles 170 through the tile interconnect buses 190 by utilizing a second wear leveling process (a dynamic wear leveling process).

Regarding the static wear leveling process, in implementation, each of the memory tiles 170 may correspond to a counter. A counter corresponding to a memory tile 170 is configured to count access numbers of initial addresses of this memory tile 170. Then, the processor 150 calculates read/write probability values of the initial addresses of this memory tile 170, and sums up the read/write probability values of the initial addresses in each row of this memory tile 170, to acquire summation read/write probability values of the rows of this memory tile 170. Based on the read/write probability values of the rows of this memory tile 170, the processor 150 changes an access process from a row which is accessed frequently to a row which is not accessed so frequently. Thus, the wear leveling among different rows of this memory tile 170 can be adjusted to be more even. In some embodiments, the static wear leveling process can be performed in the system background.

Figure 2:
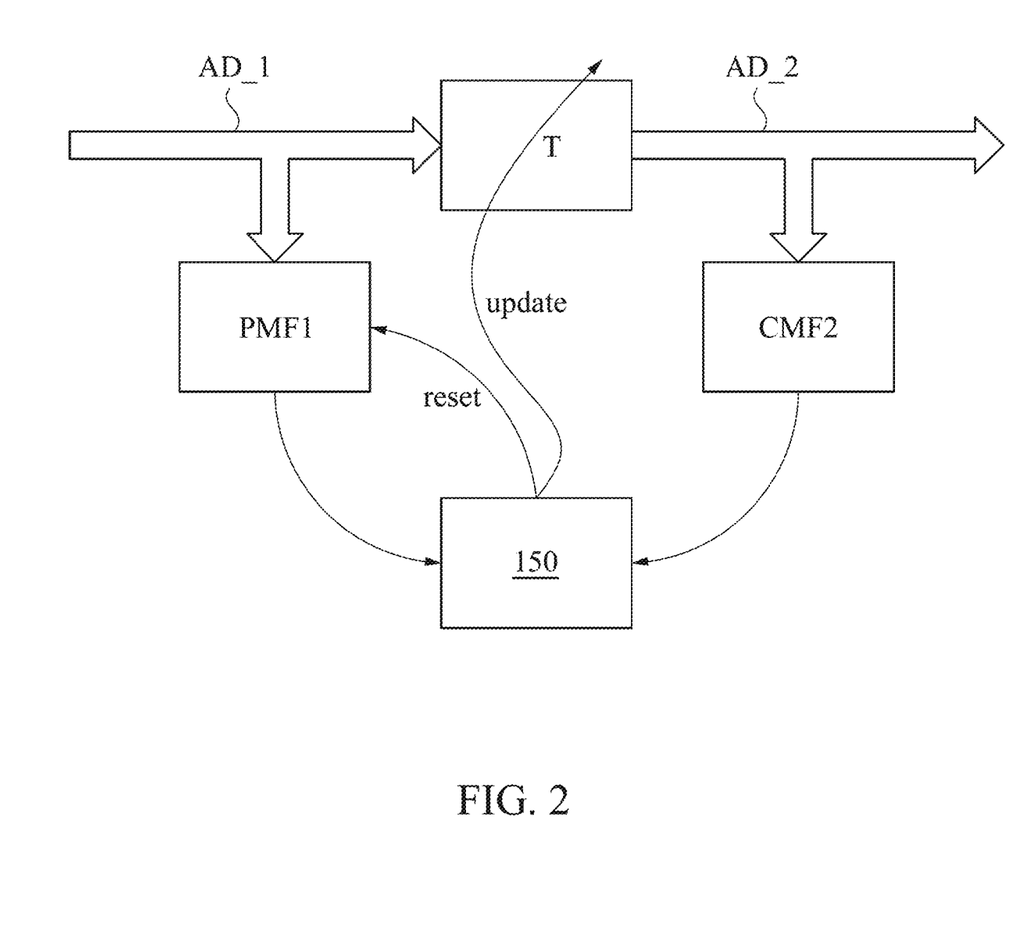
FIG. 2 is a schematic diagram illustrating updating the transfer function according to some embodiments of the present disclosure.

Reference is made to FIG. 2. FIG. 2 is a schematic diagram which illustrates updating a transfer function T according to some embodiments of the present disclosure. In some embodiments, a look-up table LUT is stored in the storage circuit 160 in FIG. 1. The look-up table LUT records the transfer function T. The transfer function T is configured to transfer the initial addresses AD_1 with uneven read/write probability values to the reassigned addresses AD_2 with more even read/write probability values.

In some embodiments, after the static wear leveling process is finished, the dynamic wear leveling process is still being performed. Regarding the dynamic wear leveling process, in implementations, the memory device 100 may include at least one counter. The counter is configured to count the read/write numbers of the initial addresses AD_1 of the memory tiles 170. Then, the processor 150 calculates the read/write probability values of the initial addresses AD_1 of the memory tiles 170, and, based on the transfer function, transfers the initial addresses AD_1 with uneven read/write probability values to the reassigned addresses AD_2 with more even read/write probability values. In other words, a variation of the read/write probability values of the reassigned addresses AD_2 is smaller than a variation of the read/write probability values of the initial addresses AD_1.

In this situation, the processor 150 can evenly read or write the reassigned addresses AD_2 to adjust the wear leveling among different memory tiles 170 to be more even and then finish the dynamic wear leveling.

Figure 3:
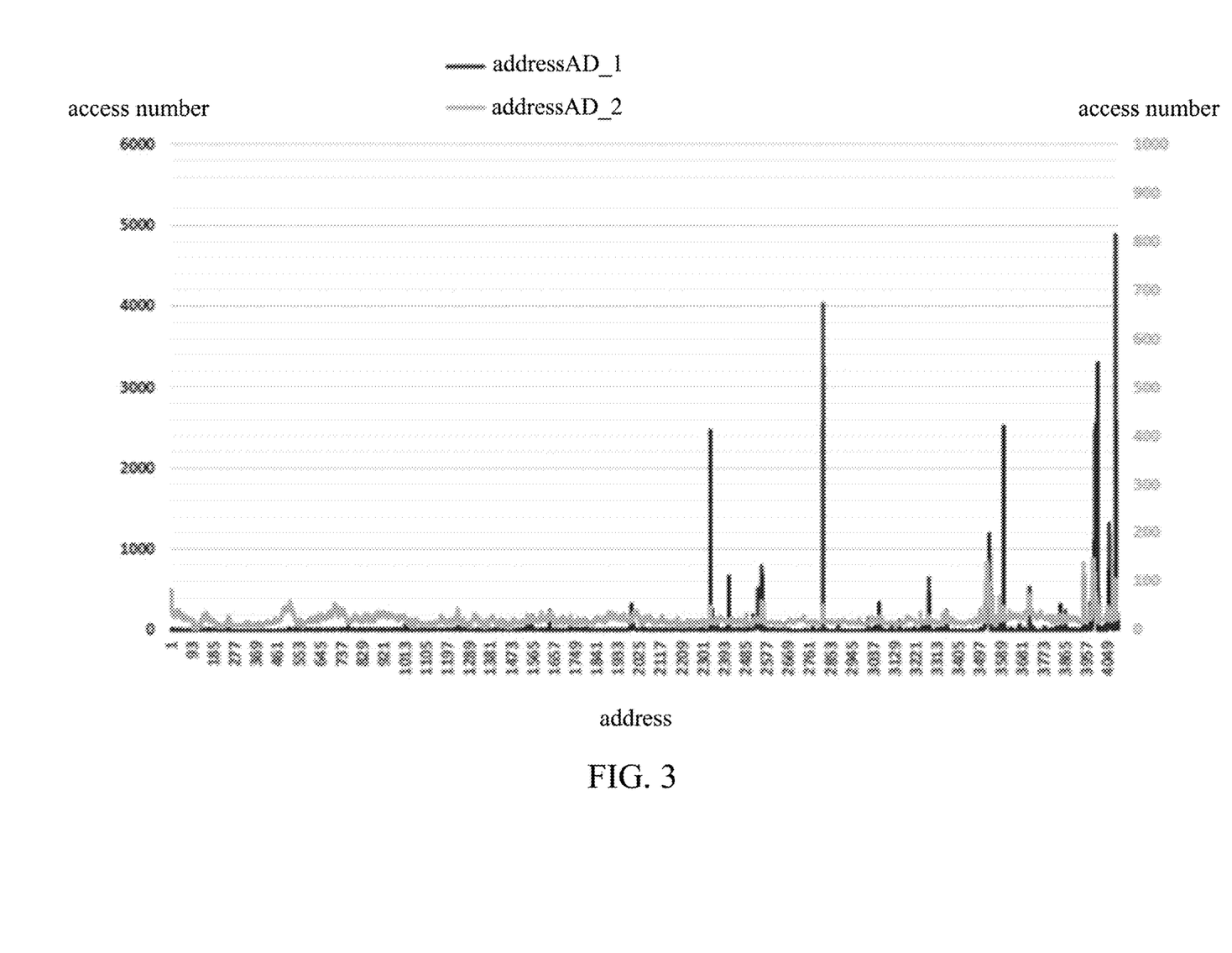
FIG. 3 is a schematic diagram illustrating access numbers of addresses according to some embodiments of the present disclosure.

Reference is made to FIG. 3. FIG. 3 is a schematic diagram illustrating access numbers of addresses according to some embodiments of the present disclosure. As illustrated in FIG. 3, the read/write numbers of the initial addresses AD_1 are not even before the dynamic wear leveling is performed. For example, compared to other addresses, the read/write numbers of the address 2301, the address 2853, the address 3589, the address 3957, and the address 4049 are very high. After the dynamic wear leveling is performed, the read/write numbers of the reassigned addresses AD_2 are adjusted to be more even.

Reference is made to FIG. 2 again. In some embodiments, the transfer function T can be updated. For example, the processor 150 acquires a probability mass function (PMF) PMF1 of the initial addresses AD_1 according to the read/write probability values of the initial addresses AD_1. The probability mass function PMF1 of the initial addresses AD_1 can indicate whether the initial addresses AD_1 are accessed evenly. In addition, the processor 150 calculates a cumulative mass function CMF2 of the reassigned addresses AD_2 according to the reassigned addresses AD_2.

Figure 4:
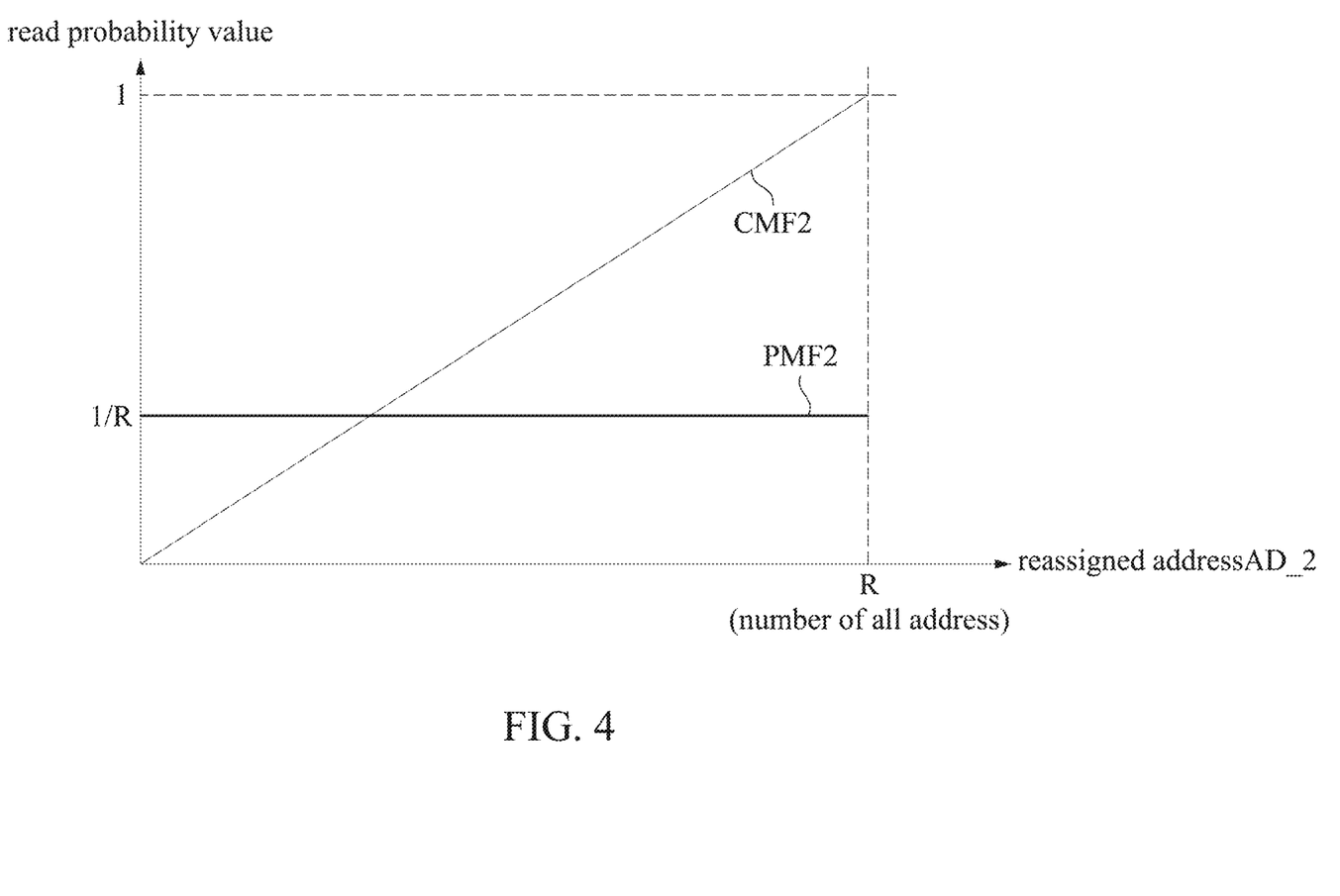
FIG. 4 is a schematic diagram illustrating a relationship between a cumulative mass function and a probability mass function according to some embodiments of the present disclosure.

Reference is made to FIG. 4. FIG. 4 is a schematic diagram illustrating a relationship between a cumulative mass function and a probability mass function according to some embodiments of the present disclosure. Since the cumulative mass function CMF2 is generated by summing up the read/write probability values of the reassigned addresses AD_2 progressively, an input-output relationship of the cumulative mass function CMF2 of the reassigned addresses AD_2 in FIG. 2 is closer to a diagonal and straight line, and a probability mass function PMF2 of the reassigned addresses AD_2 is closer to a horizontal line, as shown in FIG. 4. It indicates that the read/write probability values of the reassigned addresses AD_2 are closer to each other (more even). For example, if there are R reassigned addresses AD_2. Ideally, the read/write probability value of each of the reassigned addresses AD_2 is 1/R.

Reference is made to FIG. 2 again. The processor 150 updates the transfer function T in the look-up table LUT according to the cumulative mass function CMF2. In general, the generated input-output relationship of the cumulative mass function CMF2 based on the transfer function T, updated by the first time, may be far away from a diagonal and straight line. After updating transfer function T by the several times, the cumulative mass function CMF2 becomes closer to the diagonal and straight line.

In some situations, if the system performs different operations (for example, displaying video/operating other programs), the workload of the memory device 100 will change. If the workload of the memory device 100 changes drastically, the input-out relationship of the cumulative mass function CMF2 is very far away from the diagonal and straight line. When the input-out relationship of the cumulative mass function CMF2 is far away from a diagonal and straight line and the input-out relationship of the cumulative mass function CMF2 satisfies a specific degree (that is, linearity of the cumulative mass function CMF2 is less than a threshold value), the processor 150 erases (updates) the data in the counter, which is configured to calculate the probability mass function PMF1 (the read/write probability values of the initial addresses AD_1, and recollects (resets) the access numbers of the initial addresses AD_1, such that the transfer function T is re-updated and the cumulative mass function CMF2 is recalculated. By that, reassigned mechanism for different workload can be generated to perform a read process or a write process on the memory tiles 170 more evenly.

Figure 5:
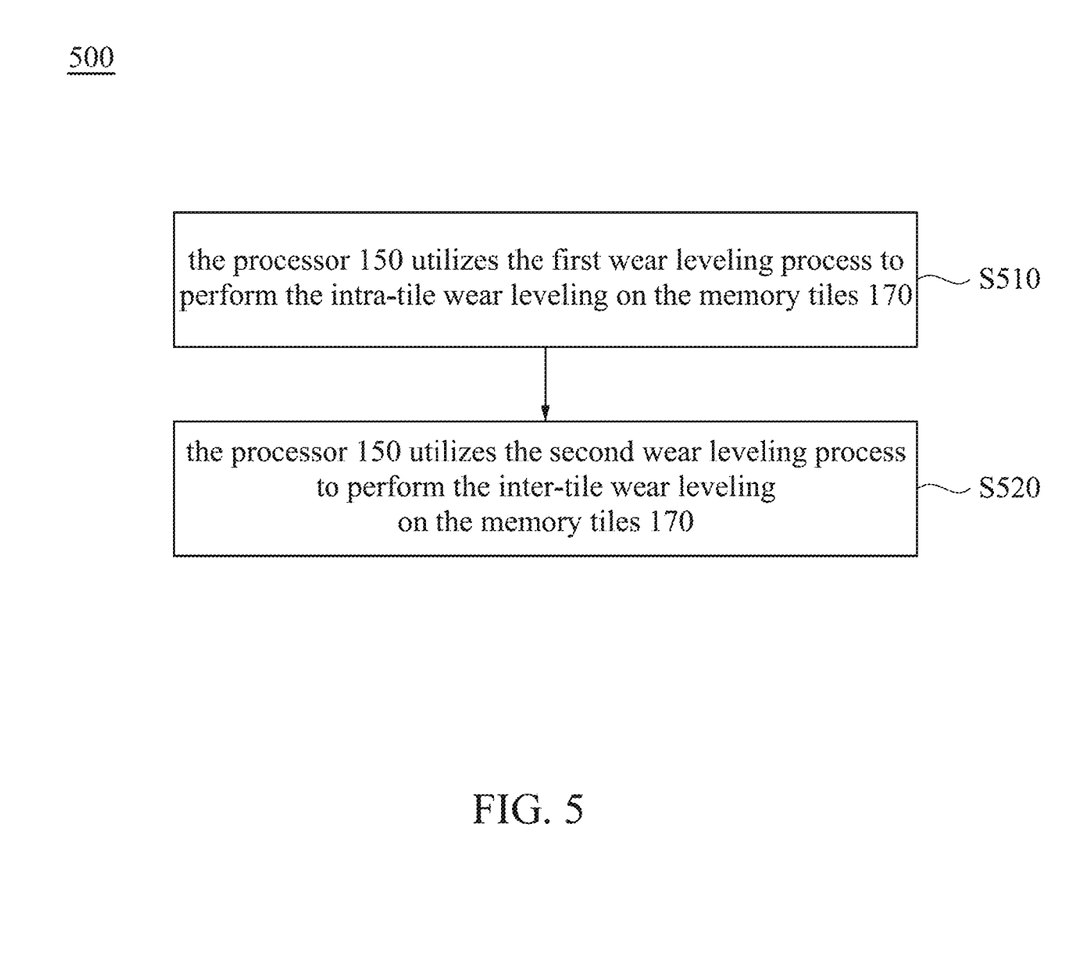
FIG. 5 is a flow diagram illustrating an operation method according to some embodiments of the present disclosure.

Reference is made to FIG. 5. FIG. 5 is a flow diagram illustrating an operation method 500 according to some embodiments of the present disclosure. In some embodiments, the operation method 500 is applied to the memory device 100 in FIG. 1, but the present disclosure is not limited thereto.

In operation S510, the processor 150 utilizes the first wear leveling process to perform the intra-tile wear leveling on the memory tiles 170. In some embodiments, the first wear leveling process is a static wear leveling process. The detailed operations about the static wear leveling process are described in aforementioned paragraphs, so they are not described herein again.

In operation S520, the processor 150 utilizes the second wear leveling process to perform the inter-tile wear leveling on the memory tiles 170. In some embodiments, the second wear leveling process is a dynamic wear leveling process. The detailed operations about the dynamic wear leveling process are described in aforementioned paragraphs, so they are not described herein again.

Figure 6:
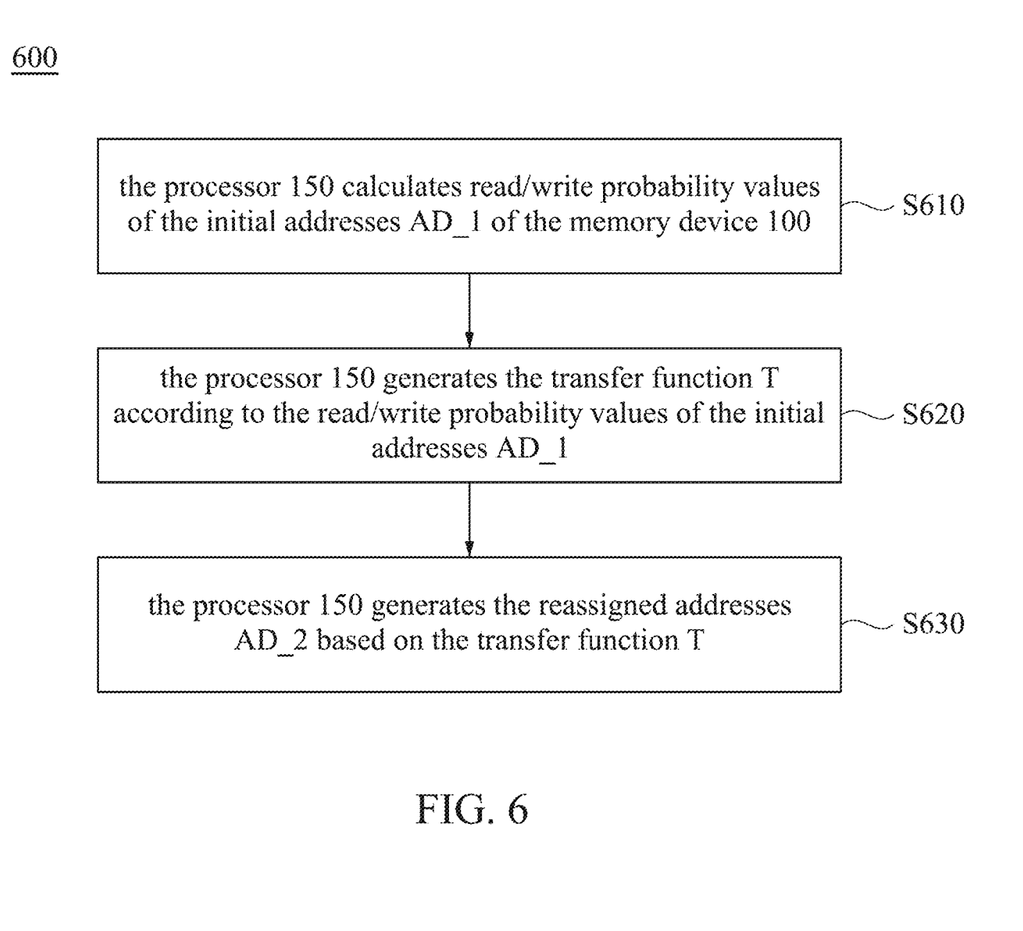
FIG. 6 is a flow diagram illustrating an operation method according to some embodiments of the present disclosure.

Reference is made to FIG. 6. FIG. 6 is a flow diagram illustrating an operation method 600 according to some embodiments of the present disclosure. The operation method 600 is configured to perform the second wear leveling process in operation S520 of FIG. 5. In other words, the operation method 600 is configured to perform the aforementioned dynamic wear leveling process.

In operation S610, the processor 150 calculates the read/write probability values of the initial addresses AD_1 of the memory device 100. In some embodiments, the counters count the access number of each of initial addresses AD_1 of all memory tiles 170. Then, the processor 150 calculates the read/write probability values of the initial addresses AD_1 to acquire the probability mass function PMF1 of the initial addresses AD_1.

In operation S620, the processor 150 generates the transfer function T according to the read/write probability values of the initial addresses AD_1. In some embodiments, the processor 150 generates or updates the transfer function T according to the probability mass function PMF1 of the initial addresses AD_1.

In operation S630, the processor 150 generates the reassigned addresses AD_2 based on the transfer function T. A variation of the read/write probability values of the reassigned addresses AD_2 is smaller than a variation of the read/write probability values of the initial addresses AD_1. In other words, the read/write probability values of the reassigned addresses AD_2 are more even.

The above description of the operation method 600 includes exemplary operations, but the operations of the fingerprint feature recognition method 600 are not necessarily performed in the order described. The order of the operations of the operation method 600 disclosed in the present disclosure are able to be changed, or the operations are able to be executed simultaneously or partially simultaneously as appropriate, in accordance with the spirit and scope of various embodiments of the present disclosure.

As the embodiments above, the memory device and the operation method can perform the wear leveling on the memory tiles effectively.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script in a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An operation method applied to a memory device, wherein the memory device comprises a plurality of memory tiles, wherein the operation method comprises:
   utilizing a first wear leveling process to perform an intra-tile wear leveling on the plurality of memory tiles by a processor; and
   utilizing a second wear leveling process to perform an inter-tile wear leveling on the plurality of memory tiles by the processor,
   wherein the second wear leveling process comprises:
   counting access numbers of a plurality of initial addresses of the memory device;
   calculating read/write probability values of the plurality of initial addresses of the memory device; and
   transferring the initial addresses with uneven read/write probability values to reassigned addresses with more even read/write probability values based on a transfer function,
   wherein a cumulative mass function of the reassigned address is to be calculated according to the reassigned address by the processor.

2. The operation method of claim 1, wherein the first wear leveling process is a static wear leveling process, and the second wear leveling process is a dynamic wear leveling process.

3. The operation method of claim 2, wherein the dynamic wear leveling process is still performed after the static wear leveling process is finished.

4. The operation method of claim 2, wherein the static wear leveling process is to perform a wear leveling on a row of one of the plurality of memory tiles.

5. The operation method of claim 1, wherein the memory device is a phase-change memory.

6. An operation method for performing a dynamic wear leveling process, wherein the operation method comprises:
   counting access numbers of a plurality of initial addresses of a memory device;

calculating a plurality of first read/write probability values of the plurality of initial addresses by a processor;

generating a transfer function according to the plurality of first read/write probability values by the processor;

generating a plurality of reassigned addresses based on the transfer function by the processor, wherein the plurality of reassigned addresses have a plurality of second read/write probability values respectively, wherein a variation of the plurality of second read/write probability values is smaller than a variation of the plurality of first read/write probability values; and calculating a cumulative mass function according to the plurality of second read/write probability values by the processor.

7. The operation method of claim 6, wherein the transfer function is stored in a look-up table, wherein the operation method further comprises:

updating the transfer function in the look-up table according to the cumulative mass function by the processor.

8. The operation method of claim 6, further comprising:

if the cumulative mass function satisfies a condition, updating a counter configured to calculate the plurality of first read/write probability values by the processor and recollecting access number data of the plurality of initial addresses.

9. The operation method of claim 8, wherein the condition is that a linearity of the cumulative mass function is less than a threshold value.

10. A memory device, comprising:

a processor;

a plurality of memory tiles;

at least one main bus disposed among the plurality of memory tiles; and at least one tile interconnect bus disposed among the plurality of memory tiles, wherein the processor performs an intra-tile wear leveling on the plurality of memory tiles through the at least one tile interconnect bus, wherein the intra-tile wear leveling process comprises:

counting access numbers of a plurality of initial addresses of each memory tile;

calculating summation read/write probability values of respective rows of the memory tile; and changing an access process from a row which is accessed frequently to a row which is not accessed so frequently based on the summation read/write probability values of the rows of the memory tile, wherein the processor counts access numbers of a plurality of initial addresses of the memory device; calculates a plurality of first read/write probability values of a plurality of initial addresses of the memory device; generates a transfer function according to the plurality of first read/write probability values; and generates a plurality of reassigned addresses based on the transfer function, wherein the plurality of reassigned addresses have a plurality of second read/write probability values respectively, wherein a variation of the plurality of second read/write probability values is smaller than a variation of the plurality of first read/write probability values, and wherein the processor calculates a cumulative mass function according to the plurality of second read/write probability values.

11. The memory device of claim 10, wherein the intra-tile wear leveling is to perform a wear leveling on a row of one of the plurality of memory tiles.

12. The memory device of claim 10, wherein an inter-tile wear leveling is still performed after the intra-tile wear leveling is finished.

13. The memory device of claim 10, wherein the memory device is a phase-change memory.

14. The memory device of claim 10, wherein the processor performs an inter-tile wear leveling on the plurality of memory tiles through the at least one tile interconnect bus.

15. The memory device of claim 10, wherein the transfer function is stored in a look-up table, and the processor updates the transfer function in the look-up table according to the cumulative mass function.

16. The memory device of claim 10, wherein if the cumulative mass function satisfies a condition, the processor updates a counter configured to calculate the plurality of first read/write probability values and access number data of the plurality of initial addresses is recollected.

17. The memory device of claim 16, wherein the condition is that a linearity of the cumulative mass function is less than a threshold value.

* * * * *